June 8, 1937.  J. R. RICHER  2,083,092
SCREW
Filed Jan. 20, 1936
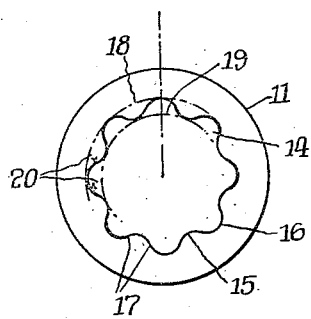
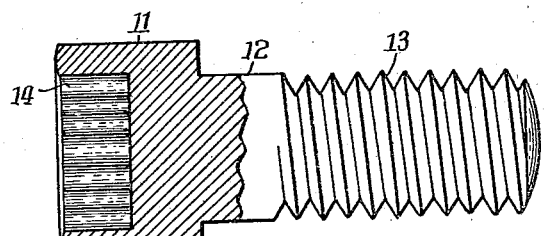
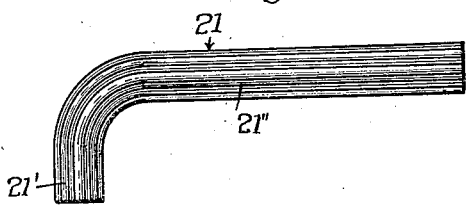
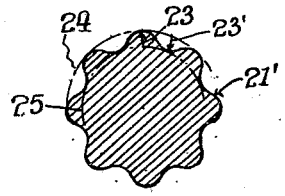
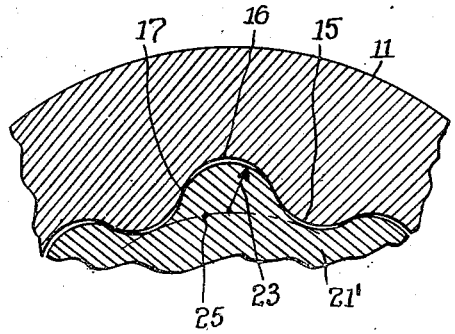
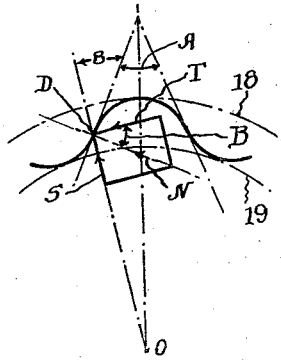
Inventor:
Joseph R. Richer, Patented June 8, 1937

2,083,092

UNITED STATES PATENT OFFICE 2,083,092

SCREW

Joseph R. Richer, Detroit, Mich.

Application January 20, 1936, Serial No. 59,866

7 Claims. (Cl. 85—45)

The invention relates more particularly to an improvement in socket head cap screws, it being the general object of the invention to provide a screw with a new and improved geometrical formation of the cap and the socket which is formed therein.

Heretofore it was customary to form the sockets of cap screws with a square, hexagonal or a splined-circle cross contour. I have discovered, however, that certain marked improvements in the strength of the screw, its method of manufacture and its ease of operation could be obtained were the socket formed or designed on a different principle.

It is another object of my invention to provide an improved screw, the socket cross contour of which consists of a series of alternating concave and convex arcs tangentially joining each other so as to form a plurality of equispaced inflections.

Another object is to provide such a screw socket with inflections having an angle of incidence or pressure relative to the radial line drawn from the center of the screw not to exceed about 40°.

Another object is to provide a socket headed screw of new and improved construction which is economical to manufacture both with respect to material and labor, and yet has a head capable of withstanding forceful tightening without spreading.

These and other objects will become more readily apparent from the following detailed description taken in connection with the accompanying drawing, in which:

Fig. 1 is a plan view of a preferred form of the invention embodied in a cap screw.

Fig. 2 is an elevation thereof, the cap of the screw being shown in cross section.

Fig. 3 illustrates a hand wrench (on a reduced scale) which is suitable for rotating the screw shown in Figs. 1 and 2.

Fig. 4 is an enlarged cross section of the wrench.

Fig. 5 is a diagrammatic view (enlarged) showing the contours of the socket and the wrench when in operative engagement.

Fig. 6 is a geometrical diagram showing the relation between the normal, tangential and spreading forces involved.

While I have illustrated in the drawing and shall herein describe a preferred form of the invention, it is to be understood that I do not intend to limit the invention to the particular arrangement shown, it being contemplated that those skilled in the art may devise various modifications and alternative constructions without departing from the spirit and scope of the appended claims.

In the form selected for purposes of disclosure, the improved screw consists of a head or cap 11 (Figs. 1 and 2) integral with a shank 12 upon which the screw thread 13 is cut or (preferably) rolled. The outside diameter of the screw thread 13 is the same as that of the bolt 12 while the diameter of the cap 11 is about fifty per cent greater. A socket 14 is formed in the cap so as to provide a prismatic cavity or indentation concentric with the cap 11 and with a depth about one-half of the height of the cap which height again is about the same as the diameter of the bolt 12. The cross sectional contour of the socket 14 is composed of a plurality (usually eight, but preferably seven or more) semicircular protuberances 15 and similar cavities 16 respectively adjoining each other in equispaced and comparatively short straight lines of inflection 17.

As shown in the drawing, the centers of the protuberances 15 are all situated in a circle 18 coinciding with the bottoms of the cavities while those of the cavities are all in a circle 19 coinciding with the tops of the protuberances, from which it follows that the radii 20 forming the protuberances and the cavities are alike and equal to the distance between the circles 18 and 19. In proportioning this socket I have found from calculations and experiments that a markedly improved screw results when the diameter of the outer circle 18 is about seventy per cent of the cap diameter, and the radii 20 are about seven per cent of the said cap diameter. Under these conditions any two inflectional tangents 17 adjacent to any cavity 16 will form an included angle A of about 45° and a pressure angle B of about 34° 15′. The importance of this proportioning will be explained hereinafter.

In Figs. 3 and 4, there is shown a wrench 21 adapted to be used for actuating the screw 12 when the end 21′ is inserted in the socket 14 (Fig. 1), the end 21″ serving as a handle. The wrench is of conventional length and shape and the only point of interest lies in the formation of its cross contour (Figs. 4 and 5). This contour also consists of alternate protuberances and cavities, the radii 23 of the protuberances and the radii 23′ of the cavities respectively being the same as the radii 20 in Fig. 1, while diameters of the outer circle 24 and the inner circle 25 of centers of the radii are from five to ten-thousandths of an inch less than the corresponding diameters 18 and 19 (Fig. 1). By this means I prevent the wrench from engaging the socket 14 at tops and bottoms of the teeth, the contact therebetween being thus deliberately thrown upon the inflectional tangents 17 (see Fig. 5).

The distribution of forces acting upon the socket wall is diagrammatically shown in Fig. 6. The torque arm is the radius OD and the tangential or useful force is denoted by T. As the pressure angle at the point of contact D is equal to B it follows that the normal force N tending to crush the socket wall at D is represented by (1) $$N = T \sec B$$

The radial force S tending to spread the socket outwardly is represented by (2) $$S = T \tan B$$

If I denote now the total torque acting upon the screw with the letter Q and the radius OD with r, I have (3) $$T = \frac{Q}{rn}$$

where n is the number of teeth in engagement.

Looking now at the Equations (1), (2) and (3), it follows that it is advantageous to have, first, a great number of teeth n, second, the teeth should be on a large radius r, and, third, the teeth should have a small pressure angle B. By reducing the pressure angle B, both the radial (S) and normal (N) forces are reduced from which it follows that the thickness of wall around the socket, the depth of the socket and the surface required to carry the normal force (N) are all reduced. A limit, however, is reached from the fact that the protuberances must be wide enough to carry the shearing force T, and the inflectional tangents must possess sufficient taper to accommodate the wrench within practical workmanship limits.

The advantages of my invention are first that the grooves are comparatively shallow, of liberal radii of curvature and free from sharp corners, second, the force distribution is favorable thus enabling the use of a comparatively shallow socket, and third, the wrench projections are well rounded thus protecting the worker's hands. I have found it entirely practical to form such sockets by means of protrusion (upsetting), which could not be done if the socket possessed sharp or nearly sharp corners or if it were too deep. By forming the thread on the shank of the screw by means of a cold rolling operation, and forming the socket by means of an upsetting operation, the entire screw may be finished without the use of any expensive machine operations, thus providing a screw which is extremely economical to manufacture and which embodies great strength.

I claim as my invention:

1. A screw comprising a head having a socket the cross contour of which consists of a series of alternating concave and convex arcs equally spaced and tangentially joining each other all about the circle.

2. A screw comprising a socket having a peripheral wall consisting of a plurality of semicylindrical protuberances equally spaced about the socket.

3. In a screw a socket having a cross contour consisting of a plurality of semicircular protuberances alternating with an equal number of semicircular cavities equally spaced about a circle concentric with the axis of the screw.

4. In a screw, a head having a socket the peripheral wall of which consists of a plurality of alternating semicylindrical projections and depressions so arranged that the adjacent projections and depressions tangentially merge one into the other at an angle not exceeding 45° as measured from the radial line drawn from the axis of the screw to the point of inflection.

5. A screw comprising a socket having a cross contour of the form of an undulating wave line forming alternate projections and depressions of substantially the same radii of curvature and a plurality of equispaced inflectional tangential straight lines interposed between and joining the said projections and depressions and constituting the bearing surfaces for the wrench.

6. A screw having a head formed with a shallow socket provided with a peripheral wall comprising alternate semicylindrical projections and depressions.

7. The combination of a socket head screw and a wrench for turning the same in which the socket cross contour consists of a plurality of teeth and spaces of a semicircular shape all possessing the same radii of curvature and the cross contour of the wrench consists of teeth and spaces of the same radii of curvature as the socket, but distributed along the circumference of a smaller circle.

JOSEPH R. RICHER.